United States Patent
Yasugi et al.

(10) Patent No.: US 9,287,814 B2
(45) Date of Patent: Mar. 15, 2016

(54) WIND TURBINE GENERATOR AND METHOD OF CONTROLLING THE SAME

(75) Inventors: Akira Yasugi, Tokyo (JP); Tsuyoshi Wakasa, Tokyo (JP); Hisanobu Shinoda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 761 days.

(21) Appl. No.: 13/117,787

(22) Filed: May 27, 2011

(65) Prior Publication Data
US 2012/0061961 A1 Mar. 15, 2012

Related U.S. Application Data

(63) Continuation of application No. PCT/JP2011/054463, filed on Feb. 28, 2011.

(51) Int. Cl.
| | |
|---|---|
| *H02P 9/10* | (2006.01) |
| *F03D 7/02* | (2006.01) |
| *F03D 9/00* | (2006.01) |
| *H02P 101/15* | (2015.01) |

(52) U.S. Cl.
CPC ............... *H02P 9/10* (2013.01); *F03D 7/0284* (2013.01); *F03D 9/003* (2013.01); *F05B 2270/337* (2013.01); *H02P 2101/15* (2015.01); *Y02E 10/723* (2013.01)

(58) Field of Classification Search
None
See application file for complete search history.

(56) References Cited

U.S. PATENT DOCUMENTS

| | | | | |
|---|---|---|---|---|
| 7,268,443 | B2 * | 9/2007 | Kikuchi et al. | 290/44 |
| 7,345,373 | B2 | 3/2008 | Delmerico et al. | |
| 7,638,893 | B2 * | 12/2009 | Wobben | 290/55 |
| 7,750,490 | B2 | 7/2010 | Scholte-Wassink | |
| 7,932,637 | B2 * | 4/2011 | Lasseter et al. | 307/69 |
| 8,237,301 | B2 * | 8/2012 | Delmerico et al. | 290/44 |
| 8,355,824 | B2 * | 1/2013 | Yasugi | 700/287 |
| 8,610,298 | B2 * | 12/2013 | Acedo Sanchez et al. | 290/44 |

(Continued)

FOREIGN PATENT DOCUMENTS

| | | |
|---|---|---|
| CN | 1410669 A | 4/2003 |
| CN | 1879275 A | 12/2006 |

(Continued)

OTHER PUBLICATIONS

Lalor, Gillian; Mullane, Alan; and O'Malley, Mark; Frequency Control and Wind Turbine Technologies; IEEE Transactions on Power Systems, vol. 20, No. 4, Nov. 2005; pp. 1905-1913.*

(Continued)

*Primary Examiner* — Christopher E Everett
(74) *Attorney, Agent, or Firm* — Kanesaka Berner and Partners LLP (57) ABSTRACT

An object of the present invention is to, if a frequency decrease has occurred in a power system, avoid a trip in a wind turbine generator and reliably contribute to recovery of the frequency of the power system. The present invention provides a wind turbine generator that, if a predetermined frequency decrease that requires PFR has occurred in the power system, calculates a marginal active power based on the difference between a predetermined rotational speed lower limit value, which is obtained by providing the parallel-off rotational speed with a predetermined margin, and a measured value of the shaft rotational speed, and generates an active power command value based on the marginal active power.

10 Claims, 4 Drawing Sheets

(56) References Cited

U.S. PATENT DOCUMENTS

| | | | |
|---|---|---|---|
| 2006/0273595 A1* | 12/2006 | Avagliano et al. | 290/44 |
| 2007/0228838 A1* | 10/2007 | Delmerico et al. | 307/84 |
| 2007/0262583 A1* | 11/2007 | Kikuchi et al. | 290/44 |
| 2011/0012352 A1* | 1/2011 | Nelson et al. | 290/44 |
| 2011/0031748 A1* | 2/2011 | Arinaga et al. | 290/44 |
| 2012/0035775 A1* | 2/2012 | Garcia | 700/287 |
| 2012/0161444 A1* | 6/2012 | Tarnowski | 290/44 |

FOREIGN PATENT DOCUMENTS

| | | | |
|---|---|---|---|
| EP | 1467463 A1 * | 10/2004 | |
| JP | 11056126 A | 3/1999 | |
| JP | 11069893 A | 3/1999 | |
| JP | 2008278725 A | 11/2008 | |
| WO | 2010095248 A1 | 8/2010 | |
| WO | 2011016278 A1 | 2/2011 | |

OTHER PUBLICATIONS

Decision to Grant corresponding to JP 2011-523227 dated Mar. 5, 2013.
Notice of Allowance corresponding to KR 2011-7012476 dated Jan. 10, 2013.
International Search Report corresponding to PCT/JP2010/058619 dated Jun. 29, 2010.
Written Opinion corresponding to PCT/JP2011/054463, dated Apr. 12, 2012.
Office Action mailed Jun. 5, 2014, corresponds to Chinese patent application No. 201180000476.X.
Notice of Allowance issued Feb. 3, 2015, corresponding to Chinese patent application No. 201180000476.X.

* cited by examiner

WIND TURBINE GENERATOR AND METHOD OF CONTROLLING THE SAME

CROSS REFERENCE TO RELATED APPLICATIONS

This is a continuation of International Application PCT/JP2011/054463, with an international filing date of Feb. 28, 2011, which is hereby incorporated by reference herein in its entirety.

TECHNICAL FIELD

The present invention relates to a wind turbine generator and a method of controlling the same.

BACKGROUND ART

In recent years, there has been demand for a system-connected wind turbine generator to be able to contribute to recovery from frequency variation in a power system (Primary Frequency Response, which is hereinafter referred to as "PFR") within a predetermined time (e.g., within 30 sec) from when a disturbance has occurred in the power system.

PTL 1 discloses the provision of a limit on active power to be output based on the rotor rotational speed or output power in PFR.

CITATION LIST

Patent Literature

{PTL 1}
U.S. Pat. No. 7,345,373

SUMMARY OF INVENTION

Technical Problem

In PFR, in general, the active power of a wind turbine generator is increased or reduced according to the deviation (amount of frequency change) between a set frequency and an actual frequency (measured value), but with a wind turbine generator whose drive source is inconstant natural energy, there are more cases where the rotational speed of the rotation shaft of the wind, turbine varies greatly, in comparison with a turbine generator whose drive source is stable, controllable energy such as gas combustion or steam.

For this reason, in the case where the rotational speed of the rotation shaft is small, for example, if an increase in output power is required in order to perform PFR, and the output power supplied to the system exceeds the maximum outputtable power determined by the rotational speed of the rotation shaft at that time, there has been the possibility of the rotational speed of the rotation shaft falling below the parallel-off rotational speed; and the operation exceeding the capacity of the wind turbine, thus resulting in a trip (output power interruption) occurring. Also, in the case where the rotational speed of the rotation shaft is high, for example, if a further increase in output power is required, there has been the possibility of the rotational speed of the rotation shaft exceeding the overspeed upper limit, thus resulting in a trip occurring in the wind turbine generator. Note that in addition to rotor overspeed, there are also cases where a trip occurs due overpower or overcurrent.

Such a trip in a wind turbine generator during the execution of PFR acts as a disturbance to the power system, and there is the risk of the frequency of the power system becoming even more unstable than in the case of not performing PFR. Also, since it takes time to restart after a trip has occurred, the wind turbine generator cannot achieve the object of recovering the frequency of the power system.

The present invention has been achieved in light of such a situation, and an object of the present invention is to provide a wind turbine generator that can reliably contribute to the recovery of the frequency of a power system in the case where a predetermined frequency variation has occurred in the power system, and a method of controlling the same.

Solution to Problem

A first aspect of the present invention is a wind turbine generator for increasing active power output to a power system in a case where a frequency decrease has occurred in the power system, the wind turbine generator including: a detection unit that detects a predetermined frequency variation; and a first control unit that, in a case where the predetermined frequency variation has been detected, calculates a marginal active power based on a difference between a predetermined rotational speed lower limit value, which is obtained by providing a parallel-off rotational speed with a predetermined margin, and a measured value of a shaft rotational speed, and generates an active power command value indicating active power to be supplied to the power system based on the marginal active power.

According to the above-described aspect, if the detection unit has detected that a predetermined frequency variation has occurred in the power system, the maximum amount of power that can be output by the rotational energy at that time (marginal active power) is calculated, and an active power command value is generated based on the marginal active power. In general, if a frequency variation that requires PFR has occurred, the amount of increase in the active power is determined based on the frequency of the power system, but it has been newly found that the amount of active power supplied from a wind turbine generator to the power system is actually clearly smaller than the amount of increase determined based, on the frequency of the power system. In view of this, instead of determining the amount of active power according to the amount of change in the system frequency as in conventional technology, the power system is supplied with the maximum amount of active power that can be output by the wind turbine generator, thus maximally contributing to the recovery of the frequency of the power system while avoiding a trip in the wind turbine generator.

The rotational speed lower limit value is a value obtained by providing the parallel-off rotational speed, at which parallel-off is executed, with a predetermined margin. The margin is a value arbitrarily determined according to the design, and one example of the margin is approximately 10%.

The active power is the power actually consumed by the load, and is expressed, by the following expression.

$$\text{active power } P = VI \cos\theta [W]$$

In the above expression, V indicates the voltage, I indicates the current, and θ indicates the phase difference between the voltage and the current.

In the above-described wind turbine generator, the detection unit may detect the predetermined frequency variation in a case where a value of the system frequency is less than a predetermined first threshold value that has been determined in advance, and furthermore an amount of change in the system frequency per unit time exceeds a predetermined second threshold value that has been determined in advance.

The fact that the predetermined frequency variation has occurred is detected when two indicators, namely the measured value of the system frequency and the amount of change per unit time, have satisfied predetermined conditions, thus enabling reliably detecting a system frequency variation that requires PFR.

In the above-described wind turbine generator, the first control unit may determine a period of a waveform of active power to be supplied to the power system according to the amount of change in the system frequency per unit time.

Determining the period of the waveform of the power command value related to the active power according to the amount of change in system frequency per unit time enables determining an appropriate amount, of active power according to the state of the power system. For example, the greater the amount of change in system frequency per unit time is, the smaller the period is set. This enables anticipating the ability to rapidly suppress a steep frequency variation, by quickly supplying active power to the power system in response to the steep frequency variation. Also, gradually raising the active power in response to a gentle frequency variation enables avoiding excessive power compensation.

In the above-described wind turbine generator, the first control unit may have an active power command value arithmetic expression containing the measured value of the shaft rotational speed as a parameter, and generate the active power command value using the arithmetic expression.

Determining the active power command value using the arithmetic expression enables obtaining an appropriate active power command value that is in accordance with the shaft rotational speed, and enables finely controlling the active power.

In the above-described wind turbine generator, the first control unit may have a table associating measured values of the shaft rotational speed and active power command values, and acquire an active power command value that is in accordance with a measured value of a shaft rotational speed using the table.

Holding such information as a table eliminates the need for complex arithmetic processing and enables easily determining an active power command value.

A second aspect of the present invention is a method of controlling a wind turbine generator for increasing active power output to a power system in a case where a frequency decrease has occurred in the power system, including the steps of: detecting a predetermined frequency variation; and calculating, in a case where the predetermined frequency variation has been detected, a marginal active power based on a difference between a predetermined rotational speed lower limit value, which is obtained by providing a parallel-off rotational speed with a predetermined margin, and a measured value of a shaft rotational speed, and generating an active power command value indicating active power to be supplied to the power system based on the marginal active power.

Advantageous Effects of Invention

The present invention achieves the effect of enabling avoiding a trip in a wind turbine generator and reliably contributing to the recovery of the frequency of a power system in the case where a predetermined frequency variation has occurred in the power system.

DESCRIPTION OF EMBODIMENTS

Below is a description of a wind turbine generator and method of controlling the same according to an embodiment of the present invention with reference to the drawings.

Figure 1:
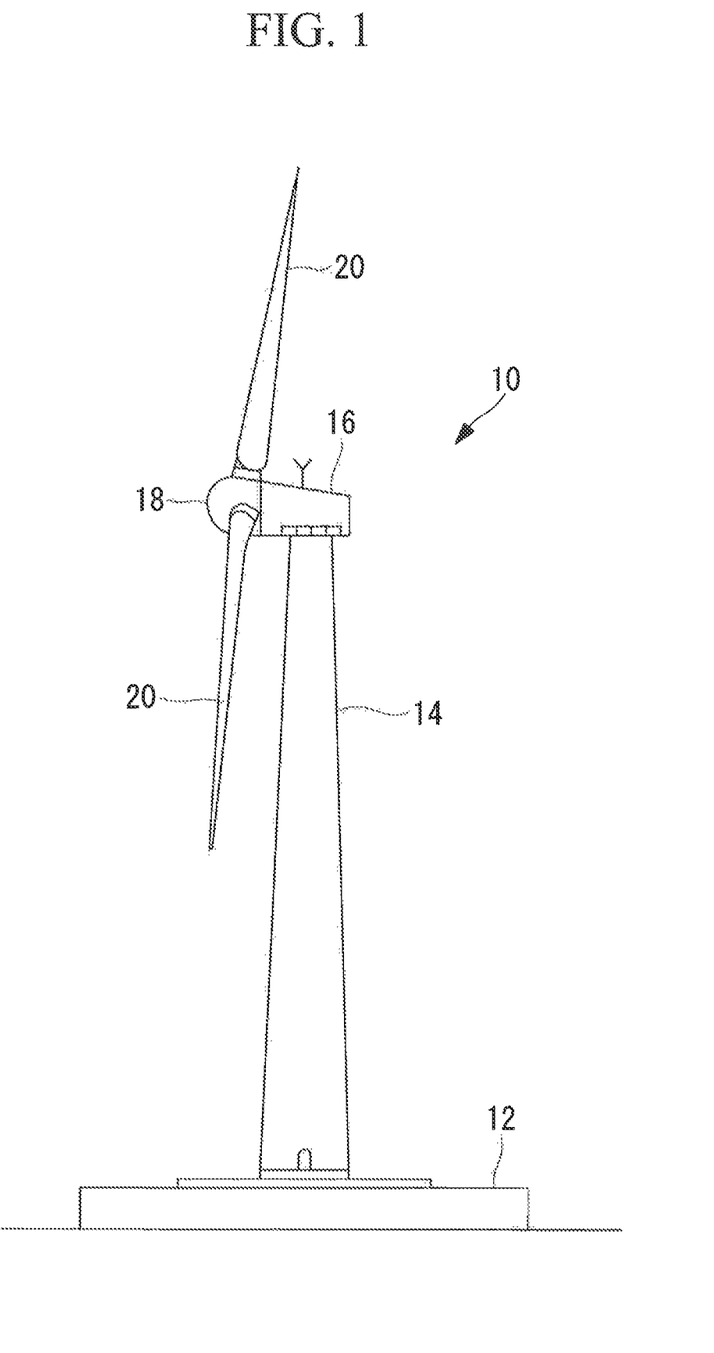
FIG. 1 is an external view of a wind turbine generator according to an embodiment of the present invention.

FIG. 1 is an external view of a wind turbine generator 10 according to this embodiment of the present invention. The wind turbine generator 10 shown in FIG. 1 is a so-called variable-speed wind turbine and has a tower 14 provided upright on a foundation 12, a nacelle 16 disposed on the upper end of the tower 14, and a rotor head 18 provided on the nacelle 16 so as to be able to rotate about a substantially horizontal axis.

A plurality of blades 20 (e.g., three in the present embodiment) are attached to the rotor head 18 in a radial configuration around the rotation shaft line of the rotor head 18. The blades 20 are coupled to the rotor head 18 so as to be able to rotate in accordance with an operating condition, and the pitch angle of the blades 20 is variable.

Figure 2:
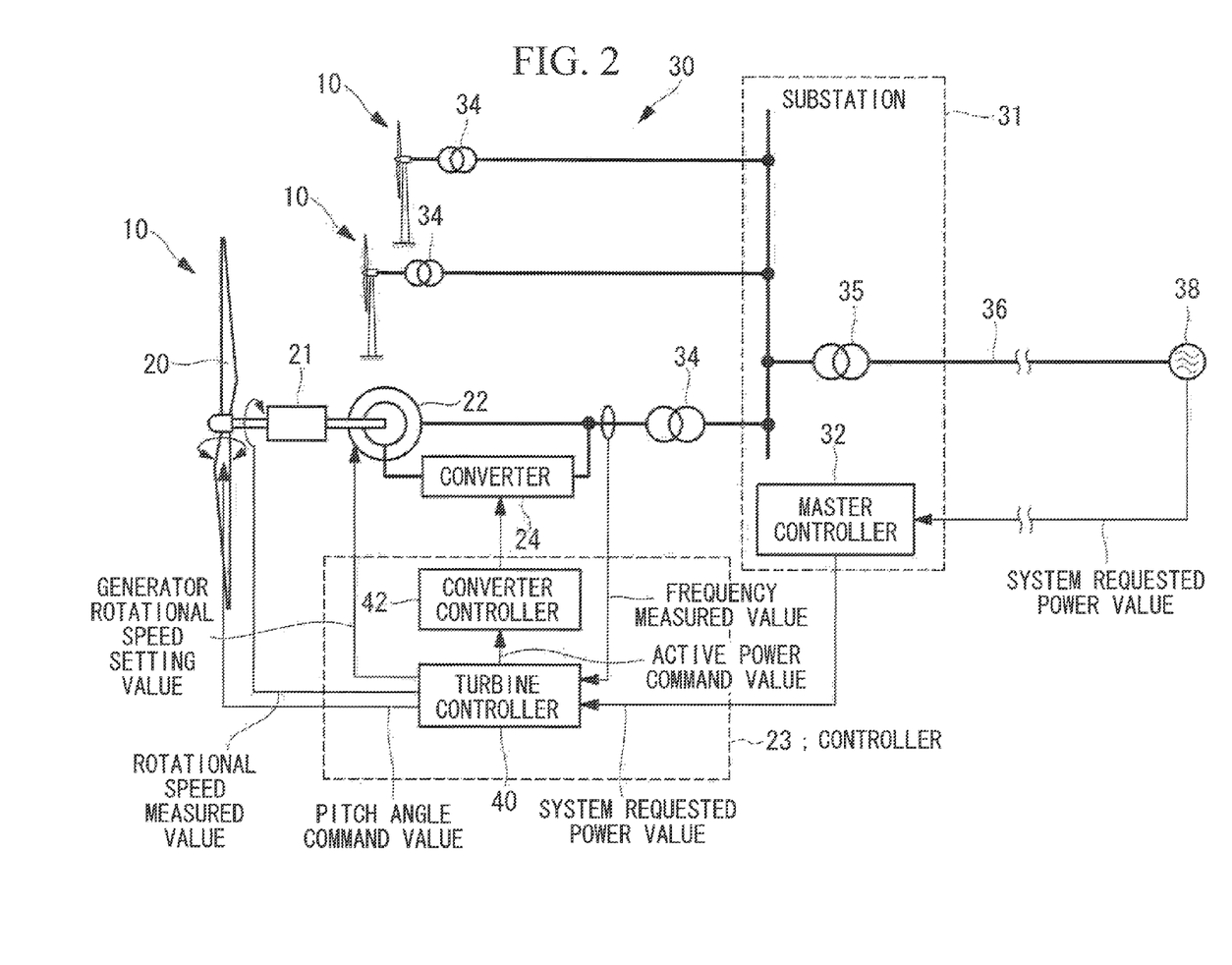
FIG. 2 is a schematic diagram showing an overall configuration of a wind power station and an electrical configuration of the wind turbine generator according to the embodiment of the present invention.

FIG. 2 is a schematic diagram showing an overall configuration of a wind power station 30 and an electrical configuration of the wind turbine generator 10 according to the present embodiment. The wind, power station 30 includes a substation 31 and a plurality of wind turbine generators 10.

The substation 31 is provided with a master controller 32 (e.g., SCADA (Supervisory Control And Data Acquisition)) that performs overall control of the wind power station 30.

The master controller 32 receives a system requested power value indicating a requested amount of active power from a power system 38, and transmits the system requested power value to the wind turbine generators 10.

The wind turbine generators 10 are each connected to the substation 31 via a transformer 34, and are system-connected via a transformer 35 included in the substation 31 and a power-transmission line 36.

Each of the wind turbine generators 10 includes a gear box 21 and a generator 22 that are mechanically coupled to the rotation shaft of the rotor head 18. Each of the wind turbine generators 10 also includes a controller 23 that controls the blade pitch angle and output power from the generator 22 and a converter 24 that is drive-controlled by the controller 23. The gear box 21, the generator 22, the controller 23, and the converter 24 are, for example, housed inside the nacelle 16 (see FIG. 1).

The controller 23 includes, for example, a turbine controller 40 and a converter controller 42.

The turbine controller 40 generates, for example, an active power command value that is in accordance with the system requested power value, and outputs the active power command value to the converter controller 42, and if a frequency variation that requires PFR has occurred in the power system, the turbine controller 40 generates an active power command value for causing a quick increase in output power. The turbine controller 40 also generates a pitch angle command value for controlling the pitch angle of the blades 20 based on the system requested power value, and outputs the pitch angle command value to a pitch actuator (not shown). The turbine controller 40 also transmits, for example, the active power of the wind turbine generator 10 and data indicating the control state of the wind turbine generator 10 to the master controller 32.

The converter controller 42 controls the converter 24 based on the active power command value received as input from the turbine controller 40.

Based on a control signal from the converter controller 42, the converter 24 controls the active power supplied from the generator 22 to the power system 38.

In such a wind turbine generator 10, the rotor head 18 is caused to rotate about its rotation shaft by the force of wind striking the blades 20 in the direction of the rotation axis of the rotor head 18, the speed of the rotational force is increased by the gear box 21, and the resultant force is transmitted to the generator 22, which generates electricity. The power generated by the generator 22 is controlled by the converter 24 based on an instruction from the controller 23, and the resultant power is sent to the substation 31 via the transformer 34. In the substation 31, the active power from the wind turbine generators 10 is composited and supplied to the power system 33 via, for example, the transformer 35 provided in the substation 31.

Figure 3:
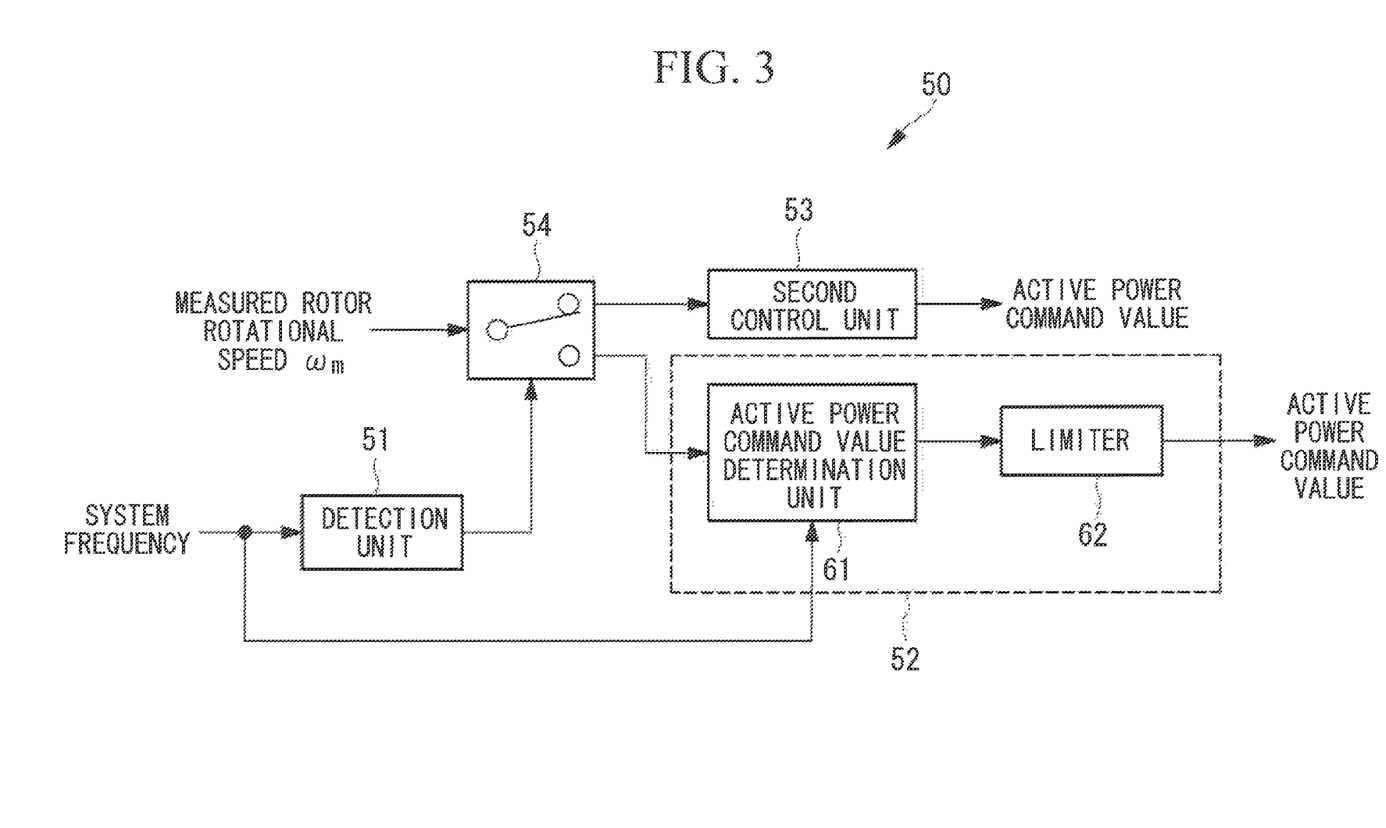
FIG. 3 is a block diagram, showing a schematic configuration of a power command value generation unit according to the embodiment of the present invention.

Next is a description of an embodiment related to the generation of the active power command value, which is a main feature of the present invention, with reference to the drawings. The active power command value is generated by an active power command value generation unit 50 included in the turbine controller 40 of the controller 23. FIG. 3 is a block diagram showing a schematic configuration of the active power command value generation unit 50.

The active power command value generation unit 50 includes a detection unit 51 that detects the occurrence of a frequency variation that requires PFR based on the system frequency, a first control unit 52 that generates an active power command value for a PFR mode, a second control unit 53 that generates an active power command value for a normal mode, and a selection unit 54 that selects either the first control unit 52 or the second control unit 53 based on a detection result obtained by the detection unit 51.

If, for example, the value of the system frequency falls below a predetermined first threshold value (e.g., 59.90 Hz in the case where the rated frequency is 60 Hz) that has been set in advance, and furthermore an amount of change in system frequency per unit time exceeds a predetermined second threshold value (e.g., 0.04 Hz/sec in the case where the rated frequency is 60 Hz) that has been set in advance, the detection unit 51 detects the occurrence of frequency variation that requires PFR, and outputs a PFR mode signal to the selection unit 54.

Upon receiving input of the PFR mode signal from the detection unit 51, the selection unit 54 selects the first control unit 52 for a predetermined time period (e.g., 10 sec) which has been set in advance, from when the signal was received, and switches to the second control unit 53 after the predetermined time period has elapsed.

The first control unit 52 includes an active power command value determination unit 61 and a limiter 62. The active power command value determination unit 61 calculates a marginal active power considered to be the maximum amount of active power that can be output by rotational energy when the PFR was detected, and generates a power command value based on the marginal active power. Specifically, the first control unit 52 determines the amount of active power that is to be supplied to the power system based on the difference between the rotor rotational speed and a rotational speed lower limit value that has been set in advance. The rotor rotational speed is the rotational speed of the rotation shaft, and although the rotational speed before speed increasing by the gear box 21 is used in FIG. 2, it is possible to use the rotational speed after speed increasing, that is to say, the rotor rotational speed of the generator 22.

The rotational speed lower limit value is a rotational speed obtained by providing the parallel-off rotational speed for parallel-off of the wind turbine generator 10 with a predetermined margin. The margin is a value arbitrarily determined according to the design, and in the present embodiment, a margin of approximately 10% is provided.

A marginal power amount p is calculated according to, for example, Expression (1) below using the rotor rotational speed.

{Exp 1}

$$p = \frac{1}{2J(\omega_m^2 - \omega_0^2)} \quad (1)$$

Here, p indicates the marginal active power of the wind turbine generator, J indicates the inertia of the system, $\omega_m$ indicates the measured rotor rotational speed before the occurrence of the frequency variation that requires PFR, and $\omega_0$ indicates the prescribed rotational speed lower limit value.

For example, if the marginal active power p is supplied to the power system 38 side as a sine wave, the active power command value at each instant of time is given by Expression (2) below.

{Exp 2}

$$\int_0^1 \Delta p \, dt = \int_0^1 (\Delta P \cdot Sbase \cdot \sin\omega_{pfr}t) dt = \frac{1}{2J(\omega_m^2 - \omega_0^2)} \quad (2)$$

$$\omega_{pfr} = \frac{a}{f_{grad}} \quad (3)$$

In Expression (2), $\Delta p$ indicates the active power command value at each instant of time, $\Delta P \cdot Sbase$ indicates the amplitude of the sine wave (Sbase being the rated power), $\omega_{pfr} \cdot t$ indicates the period of the sine wave, and a indicates a predetermined, constant. Also, as shown in Expression (3), $\omega_{pfr}$ is a function of the amount of change in system frequency per unit time, and the value of $\omega_{pfr}$ decreases as the amount of change in system frequency per unit time $f_{grad}$ increases.

Figure 4:
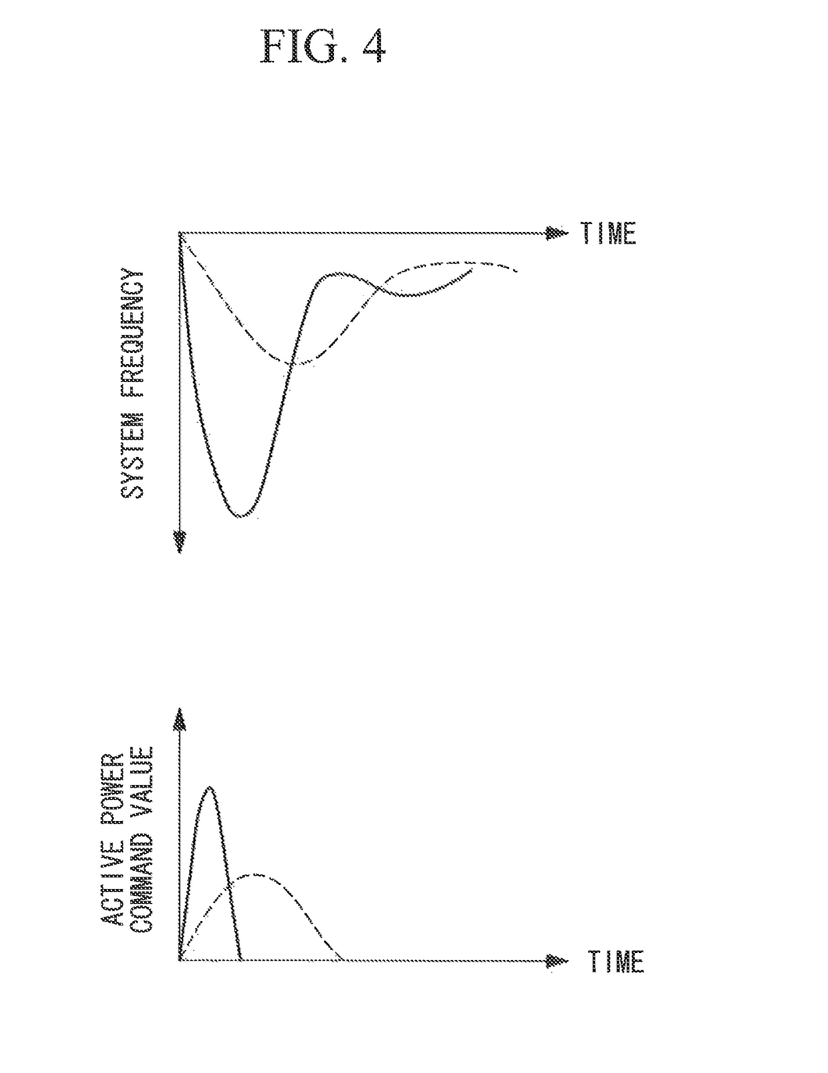
FIG. 4 is a diagram showing a comparison of power command value waveforms in the case of steep variation in system frequency and the case of gentle variation in system, frequency.

Accordingly, as can be seen by the comparison in FIG. 4, when the amount of change in system frequency per unit time is relatively large, that is to say, when the slope of the system frequency is steep as shown by the solid, lines in FIG. 4, the period of the power command value in the PFR mode is short. On the other hand, when the amount of change in system frequency per unit time is relatively small, that is to say, when the slope of the system frequency is gentle as shown by the broken lines in FIG. 4, the period of the active power command value in the PFR mode is long. Note that the areas defined by the waveforms in both cases, that is to say, the active power that is supplied, are the same as shown in Expression (1) above.

In this way, by changing the period of the sine wave of the active power command value according to the slope of the decrease in the system frequency, active power is quickly supplied to the power system rapidly in response to a steep frequency variation, thus making it possible to anticipate the ability to appropriately suppress such a variation, and by gently raising the active power in response to a gentle frequency variation, it is possible to avoid excessive power compensation.

The limiter 62 in the first control unit 52 suppresses ΔP·Sbase, which is the active power command value at each instant of time obtained by Expression (2) above, so as not to exceed a power upper limit value, which is determined based on constraints arising from the mechanical configuration of the wind turbine generator (e.g., the heat resistance of electrical equipment and the load of mechanical equipment). This enables avoiding a trip in the wind turbine generator 10 and reliably supplying generated power to the power system 38.

The second control unit 53 generates an active power command value in the normal mode. For example, the second control unit 53 generates an active power command value that is in accordance with the measured rotor rotational speed.

In the wind turbine generator 10 having such a configuration, if the system frequency is stabile, the second control unit 53 is selected by the selection unit 54, and an active power command value generated by the second control unit 53 is output to the converter controller 42 (see FIG. 2). The converter controller 42 controls the converter 24 based on the active power command value received as input, and thus active power that is in accordance with the active power command value generated by the second control unit 53 is supplied to the power system 38. If a disturbance occurs in the power system 38 in this state, and the detection unit 51 has detected, based on a decrease in the system frequency, that a frequency variation that requires PFR has occurred, a PFR mode signal is output to the selection unit 54.

Upon receiving the PFR mode signal, the selection unit 54 switches from the second control unit 53 to the first control unit 52.

Accordingly, the active power command value determination unit 61 of the first control unit 52 receives an input of the measured rotor rotational speed and the amount of change in system frequency per unit time as input information, and uses Expression (2) above to generate a sine wave active power command value based on the received information. Due to being transmitted via the limiter 62, the active power command value is suppressed so as not to exceed the upper limit value determined by thermal and strength-related constraints in the mechanical configuration of the wind turbine generator 10, and the resultant value is output to the converter controller 42. The converter controller 42 controls the converter 24 based on the active power command value received as input.

Accordingly, active power that makes the best possible use of the rotational energy of the wind turbine generators 10 is supplied to the power system 38, thus contributing to a quick recovery from frequency variation.

As described above, according to the wind turbine generator and the method of controlling the same according to the present embodiment, the active power supplied to the power system is set to the maximum amount of active power that can be output to the extent that a trip does not occur in the wind turbine generator 10, thus making it possible to avoid the loss of the ability of the wind turbine generator 10 to supply active power to the power system due to an excessive increase or decrease in active power in the case of recovering from frequency variation in the power system 38.

Furthermore, the period of the generated power is determined based on the amount of change in system frequency per unit time, or in other words, the slope of the decrease in the system frequency, thus making it possible to appropriately suppress a steep frequency variation by quickly supplying active power to the power system in response to the frequency variation, and making it possible to avoid excessive power compensation by gently raising the active power in response to a gentle frequency variation.

Note that in the wind turbine generator and the method of controlling the same of the present embodiment, although the case is described in which the first control unit 52 holds an arithmetic expression whose parameters are the rotor rotational speed and the amount of change in system frequency per unit time, and the active power command value is generated using the arithmetic expression, it is alternatively possible to, for example, segment the rotor rotational speed into a plurality of rotational speed levels and store, in advance, a table associating active power command values with the rotational speed levels. In such a case, the active power command value associated, with each of the rotational speed levels is, in the exemplary case where a certain rotational speed level is greater than or equal to α and less than β, the power command value obtained when substituting (α+β)/2, which is an intermediate value of the rotational speed level, in the above Expression (2). Also, since the period of the waveform of the active power command value is determined by the amount of change in system frequency per unit time, it is possible to provide a two-dimensional table whose variables are the rotational speed level and the amount of change in system frequency per unit time. Holding active power command values as a table in this way enables easily generating an active power command value without performing troublesome arithmetic processing.

Also, although an active power command value is generated as a sine wave in the present embodiment, the waveform is not limited to this example.

Moreover, although the wind power station 30 is illustrated as an example in the description of the present embodiment, the present invention is also applicable to the case where power is generated by one wind turbine generator.

Furthermore, although an active power command value is determined using the rotor rotational speed in the present embodiment, it is alternatively possible to use the rotational speed of the generator.

Still further, although a wind turbine generator employing a synchronous generator is illustrated as an example in the description of the present embodiment, the configuration of the generator is not limited to this example.

Also, in the wind turbine generator 10 of the present embodiment, the active power command value generation unit 50 included in the turbine controller 40 may be configured by a combination of dedicated control circuits, or may have a configuration realized by software. In the case where the processing of the above-described units is realized by software, the active power command value generation unit 50 includes a CPU, a main storage device such as a RAM, and a computer-readable recording medium on which programs for realizing part or all of the above-described processing are recorded, and the processing of the above-described units is realized by the CPU reading out the programs recorded on the recording medium, manipulating information, and performing arithmetic processing.

Examples of the computer-readable recording medium include a magnetic disk, a magneto-optical disk, a CD-ROM, a DVD-ROM, and a semiconductor memory.

REFERENCE SIGNS LIST 10 wind turbine generator
16 nacelle 18 rotor head
20 blade
21 gear box
22 generator
23 controller
24 converter
30 wind power station
31 substation
38 power system
40 turbine controller
42 converter controller
50 active power command value generation unit
51 detection unit
52 first control unit
53 second control unit
54 selection unit
61 active power command value determination unit
62 limiter

The invention claimed is:

1. A wind turbine generator for increasing active power output to a power system while avoiding a trip in a case where a frequency decrease has occurred in the power system, the wind turbine generator comprising:
 a detection unit that detects a predetermined frequency variation; and
 a first control unit that, in a case where the predetermined frequency variation that requires a PFR (Primary Frequency Response) has been detected by the detection unit, calculates a marginal active power based on a difference between a predetermined rotational speed lower limit value, which is obtained by providing a parallel-off rotational speed with a predetermined margin, and a measured value of a shaft rotational speed, and generates and outputs an active power command value indicating active power to be supplied to the power system based on the marginal active power, to avoid a trip,
 wherein the first control unit outputs, in the case where the active power command value exceeds a power upper limit value which is determined based on constraints arising from the mechanical configuration of the wind turbine generator, the power upper limit value as the active power command value.

2. The wind turbine generator according to claim 1, wherein the detection unit detects the predetermined frequency variation that requires the PFR in a case where a value of the system frequency is less than a predetermined first threshold value that has been determined in advance, and furthermore an amount of change in the system frequency per unit time exceeds a predetermined second threshold value that has been determined in advance.

3. The wind turbine generator according to claim 1, wherein the first control unit determines a period of a waveform of active power to be supplied to the power system according to the amount of change in the system frequency per unit time.

4. The wind turbine generator according to claim 3, wherein the period determined by the first control unit becomes shorter as the amount of change in the system frequency per unit time increases.

5. The wind turbine generator according to claim 1, wherein the first control unit has an active power command value arithmetic expression containing the measured value of the shaft rotational speed as a parameter, and generates the active power command value using the arithmetic expression.

6. The wind turbine generator according to claim 1, wherein the first control unit has a table associating measured values of the shaft rotational speed and active power command values, and acquires an active power command value that is in accordance with a measured value of a shaft rotational speed using the table.

7. The wind turbine generator according to claim 1, further comprising:
 a second control unit that generates an active power command value in accordance with the measured value of the shaft rotational speed; and
 a selection unit that selects the first control unit for a predetermined time period when the predetermined frequency variation is detected by the detection unit, and then selects the second control unit after the predetermined time period has elapsed;
 wherein the active power to be supplied to the power system is controlled on the basis of the active power command value determined by the first or second control unit which is selected by the selection unit.

8. A method of controlling a wind turbine generator for increasing active power output to a power system while avoiding a trip in a case where a frequency decrease has occurred in the power system, comprising:
 a first step of detecting a predetermined frequency variation;
 a second step of calculating, in a case where the predetermined frequency variation that requires a PFR (Primary Frequency Response) has been detected, a marginal active power based on a difference between a predetermined rotational speed lower limit value, which is obtained by providing a parallel-off rotational speed with a predetermined margin, and a measured value of a shaft rotational speed, and generating and outputting from a control unit a first active power command value indicating active power to be supplied to the power system based on the marginal active power, to avoid a trip; and
 outputting from the control unit, in a case where the first active power command value exceeds a power upper limit value which is determined based on constraints arising from the mechanical configuration of the wind turbine generator, the power upper limit value as the active power command value.

9. The method of claim 8, further comprising:
 a third step of generating a second active power command value in accordance with the measured value of the shaft rotational speed;
 wherein the active power to be supplied to the power system is controlled on the basis of the first active power command value for the predetermined time period when the predetermined frequency variation is detected, and then the active power to be supplied to the power system is controlled on the basis of the second active power command value after the predetermined time period has elapsed.

10. The method of controlling the wind turbine generator according to claim 8,
 wherein, in the second step, a period of a waveform of active power to be supplied to the power system is determined according to the amount of change in the system frequency per unit time.

* * * * *